US012423361B2

(12) United States Patent
Aggarwal et al.

(10) Patent No.: US 12,423,361 B2
(45) Date of Patent: Sep. 23, 2025

(54) DATA EXTRACTION APPROACH FOR RETAIL CRAWLING ENGINE

(71) Applicant: Pinterest, Inc., San Francisco, CA (US)

(72) Inventors: Amit Aggarwal, Los Altos, CA (US); Andrey Zaytsev, Fort Collins, CO (US); Ruslan Gilfanov, Boulder, CO (US)

(73) Assignee: Pinterest, Inc., San Francisco, CA (US)

( * ) Notice: Subject to any disclaimer, the term of this patent is extended or adjusted under 35 U.S.C. 154(b) by 0 days.

(21) Appl. No.: 17/486,562

(22) Filed: Sep. 27, 2021

(65) Prior Publication Data

US 2023/0095711 A1  Mar. 30, 2023

(51) Int. Cl.
*G06F 16/951* (2019.01)
*G06F 16/958* (2019.01)
*G06Q 30/0201* (2023.01)

(52) U.S. Cl.
CPC .......... *G06F 16/951* (2019.01); *G06F 16/986* (2019.01); *G06Q 30/0201* (2013.01)

(58) Field of Classification Search
CPC .. G06F 16/951; G06F 16/986; G06Q 30/0201
USPC ....................................................... 707/709
See application file for complete search history.

(56) References Cited

U.S. PATENT DOCUMENTS

| 6,654,734 | B1 * | 11/2003 | Mani | G06F 16/95 |
| 9,323,731 | B1 * | 4/2016 | Younes | G06F 40/143 |
| 10,460,018 | B1 * | 10/2019 | Ravi | G06F 40/106 |
| 10,542,021 | B1 * | 1/2020 | Mehr | H04L 63/1416 |
| 2005/0160014 | A1 | 7/2005 | Moss et al. | |
| 2006/0011720 | A1 * | 1/2006 | Call | G06Q 30/02 |
| | | | | 705/26.1 |
| 2007/0073599 | A1 * | 3/2007 | Perry | G06Q 30/02 |
| | | | | 705/26.5 |
| 2008/0098300 | A1 * | 4/2008 | Corrales | G06F 16/986 |
| | | | | 707/E17.118 |

(Continued)

OTHER PUBLICATIONS

International Search Report and Written Opinion dated Dec. 22, 2022 in corresponding International Application No. PCT/US2022/076962.

(Continued)

*Primary Examiner* — Hung T Vy
(74) *Attorney, Agent, or Firm* — Haynes and Boone, LLP

(57) ABSTRACT

A computer system extracts product data from a website and correlates product records from multiple sources to one another as corresponding to the same product. A website is crawled efficiently by rendering webpages using a virtual browser that ignores blacklisted elements, extracts data from objects without rendering, and suppressing retrieval of remote resources. Data is extracted according to engine control statements including a selector and extractor. A website may be crawled repeatedly and changes in extracted data may be detected and flagged. Engine control statements may be automatically changed in response to detecting a change in the configuration of the website. Images of product records may be correlated with one another by first comparing text of the product records and selecting images for comparison based on composition. Images are compared using a machine learning model. Images determined to be similar may be presented to a human for a correlation decision.

20 Claims, 8 Drawing Sheets

(56) References Cited

U.S. PATENT DOCUMENTS

| | | |
|---|---|---|
| 2010/0211377 A1 | 8/2010 | Aoyama et al. |
| 2011/0066662 A1* | 3/2011 | Davis .................. G06F 40/258 |
| | | 707/811 |
| 2012/0102046 A1* | 4/2012 | Tamano ............... G06F 16/3347 |
| | | 707/E17.069 |
| 2013/0024441 A1* | 1/2013 | Sun ....................... G06F 16/951 |
| | | 707/E17.108 |
| 2014/0129920 A1 | 5/2014 | Sheretov et al. |
| 2016/0103861 A1* | 4/2016 | Jacob .................... G06F 16/958 |
| | | 707/711 |
| 2016/0225053 A1 | 8/2016 | Romley et al. |
| 2017/0330081 A1* | 11/2017 | Lindsley ................ G06N 5/043 |
| 2018/0129905 A1* | 5/2018 | Soundararajan ....... G06Q 30/00 |
| 2018/0150562 A1* | 5/2018 | Gundimeda .......... G06F 40/205 |
| 2018/0150869 A1* | 5/2018 | Finnegan ........... G06Q 30/0239 |
| 2018/0197223 A1 | 7/2018 | Grossman |
| 2018/0322103 A1* | 11/2018 | Yeo ..................... G06V 40/1365 |
| 2019/0043095 A1 | 2/2019 | Grimaud et al. |
| 2019/0171902 A1 | 6/2019 | Yamaguchi et al. |
| 2019/0190946 A1* | 6/2019 | Nagaraja ............. G06F 16/9535 |
| 2019/0278814 A1* | 9/2019 | Sachdev ............. H04L 61/5076 |
| 2019/0356948 A1 | 11/2019 | Stojancic et al. |
| 2020/0252413 A1 | 8/2020 | Buzbee et al. |
| 2021/0174128 A1 | 6/2021 | Charnock et al. |
| 2021/0209425 A1 | 7/2021 | Nataraj et al. |
| 2021/0248624 A1* | 8/2021 | Keren .................. G06Q 50/184 |
| 2021/0256201 A1* | 8/2021 | Bradley ................ H04L 67/535 |
| 2022/0318315 A1* | 10/2022 | Wyle .................... G06V 30/414 |
| 2023/0040412 A1 | 2/2023 | Ramsl |

OTHER PUBLICATIONS

Unnikrishnan, Ranjith and Martial Hebert. "Measures of Similarity," 2005 Seventh IEEE Workshops on Applications of Computer Vision (WACV/MOTION'05), Jan. 5-7, 2005,—vol. 1, pp. 394-394, XP031059117, ISBN: 978-0-7695-2271-5, Abstract.

Wu, Songhao : "Web Scraping Basics", Jul. 15, 2020 (Jul. 15, 2020), XP093006359, Retrieved from the Internet: URL: https://towardsdatascience.com/web-scraping-basics-82f8b5acd45c [retrieved on Dec. 8, 2022], p. 10.

* cited by examiner

DATA EXTRACTION APPROACH FOR RETAIL CRAWLING ENGINE

RELATED APPLICATIONS

This application is related to U.S. patent application Ser. No. 17/486,556, filed Sep. 27, 2021, and U.S. patent application Ser. No. 17/486,567, filed Sep. 27, 2021, which are incorporated herein by reference for all purposes.

BACKGROUND

Field of the Invention

This invention relates to web crawlers for automatically extracting data from a webpage.

Background of the Invention

A modern retailer must have a presence on the internet to survive. A website of a retailer may comprise thousands of webpages. For example, there may be a homepage associated with the high-level domain of the retailer (e.g., "retailer.com"). Each product offered for sale by the retailer may have its corresponding product page. Classes of products may have corresponding pages. Other pages may offer additional content such as how-to videos, blogs, user-uploaded content, and the like.

The content of a website may be discovered and content extracted therefrom using a web crawler. A web crawler is computer software that is programmed to request webpages and identify content and links to other webpages included therein. For a large website, a web crawler may take a long time. to discover all webpages. In addition, the many requests for webpages generated by a web crawler may impact the performance of the web site.

It would be an advancement in the art to provide an improved approach for crawling a large website with many webpages.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
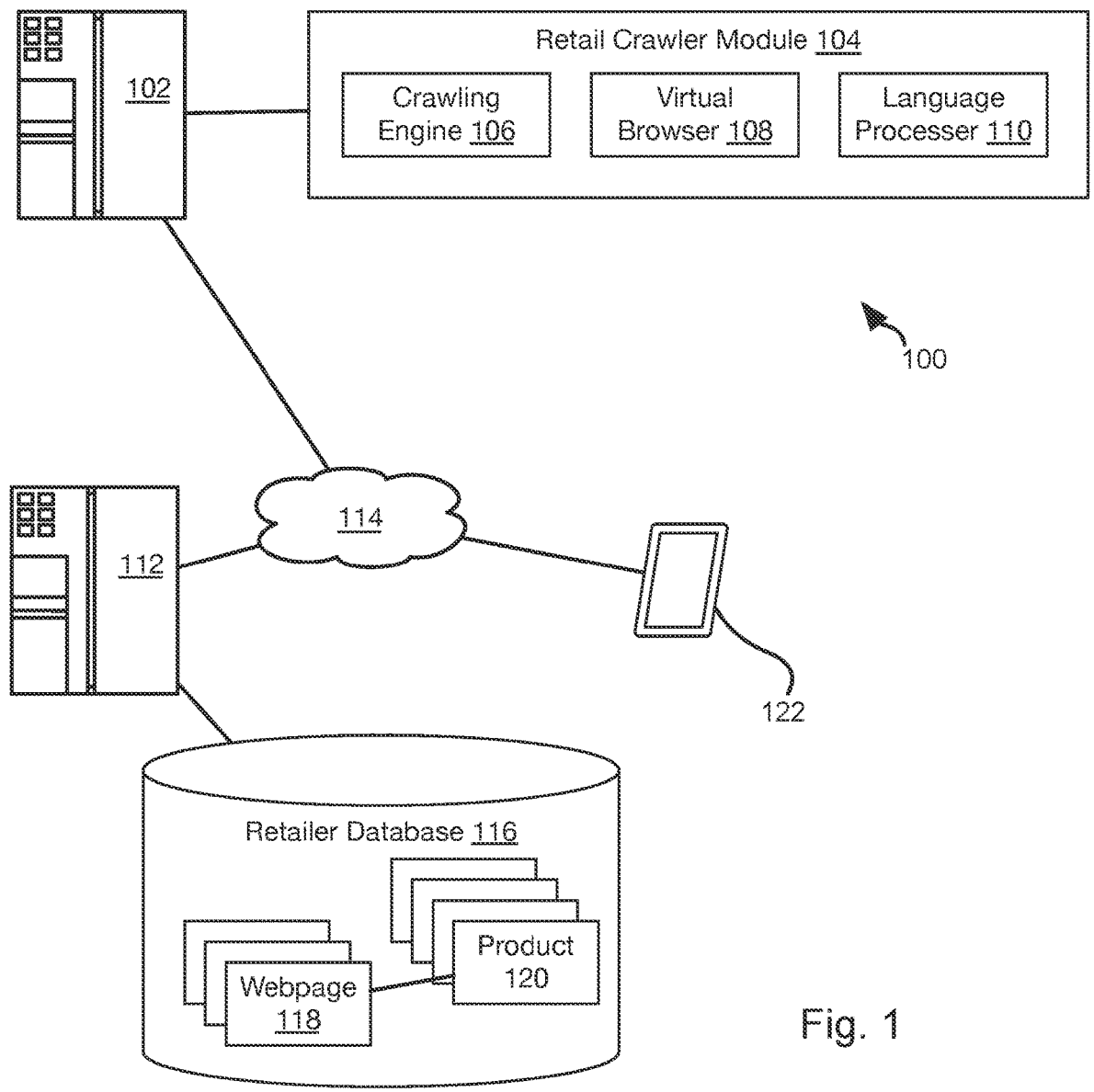
FIG. 1 is a diagram illustrating a network environment in accordance with an embodiment of the present invention.

Referring to FIG. 1, a network environment 100 may include a server system 102. The server system 102 may execute a retail crawler module 104 programmed to request webpages from retailer websites and extract product data. The retail crawler module 104 may include a crawling engine 106, virtual browser 108, and language processor 110.

The crawling engine 106 may be programmed to crawl the website of a retailer, such as according to a predefined schedule. The crawling engine 106 may start with a high level URL (uniform resource locator) for a web site, request the webpage associated with that URL, and extract information from it, which may include one or more other URLs. The crawling engine 106 may then process the one or more other URLs in a like manner. The crawling engine 106 may make use of a virtual browser 108. The virtual browser may at least partially render a webpage in order to extract information therefrom. The crawling engine 106 may further access a language processor 110. The language processor 110 may process scripts of engine control statements that control operation of the crawling engine 106 in order to improve efficiency of the crawling engine 106. The operation of the crawling engine 106, virtual browser 108, and language processor 110 are described in further detail below.

The server system 102 may be connected to the server system 112 of a retailer by means of a network 114. The network 114 may include one or more wired or wireless connections and may include a local area network (LAN), wide area network (WAN), the Internet, or other type of network.

The server system 112 may host or access a retailer database storing webpages 118. The webpages 118 may include or be linked to data included in a plurality of product records 120 listing data describing products offered for sale by the retailer. For example, there may be a homepage associated with the high-level domain of the retailer (e.g., "retailer.com"). Each product offered for sale by the retailer may have a corresponding product webpage. Classes of products may have corresponding webpages. Other pages may offer additional content such as how-to videos, blogs, user-uploaded content, and the like.

The server system 112 may host a webserver for receiving requests including URLs referencing the webpages 118 and returning the webpages 118 in response to the requests. The server system 112 may also implement an API (application programming interface) defining functions that may be used by third parties to access the retailer database 116. Accordingly, the crawling engine 106 may one or both of request webpages by URL as a conventional browser or issue function calls to the API in order to retrieve the product records 120 directly. The retailer database 116 may provide product data in two forms: (a) a catalog, list, database table, or other data structure listing product identifiers and one or more items of data describing each product identifier and (b) product pages presenting an interface for viewing images and descriptors corresponding to a product identifier. Accordingly, the crawling engine 106 may access both (a) and (b) in order to characterize the products offered for sale by the retailer.

A user may access the website of the retailer by means of a user computing device 122, such as using a browser executing on the user computing device 122. The user computing device 122 may be a desktop or laptop computer, notebook computer, tablet computer, smart phone, wearable computer, smart speaker, internet of things (IoT) device, or any computing device known in the art. The user computing devices 122 may communicate with the retailer server system 112 by means of the network 114.

Figure 2:
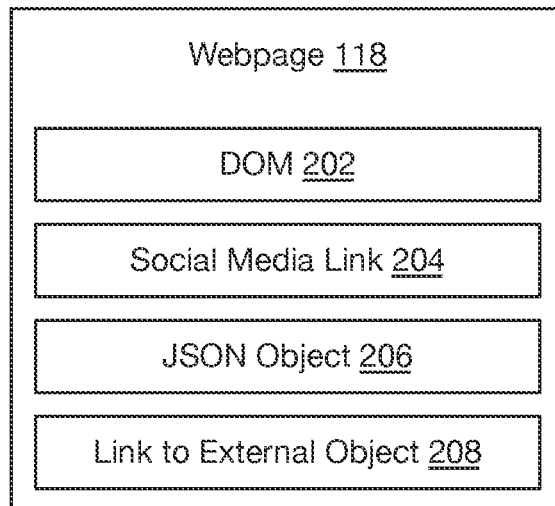
FIG. 2 is a schematic block diagram of components of a webpage in accordance to the prior art.

Referring to FIG. 2, there are various configurations for a webpage 118. A webpage 118 as known in the art is typically an HTML (hypertext markup language) document that includes content (text, image, URLs, etc.) and instructions to a browser for formatting the content. Webpages 118 processed according to the methods disclosed herein may include a document object model (DOM) 202 that is a hierarchical structure referencing elements of the webpage 118 and relationships between them. These elements may include content, scripts, other executables, and any other type of object that may form part of a webpage 118 as known in the art.

Some elements of a webpage 118 may include links 208 to social media sites, JAVASCRIPT object notation (JSON) objects 206, and links to external objects (images, videos, text, audio files, executable files, etc.). Links 208 to external objects may be implemented as executable code that instructs a browser that has loaded the webpage 118 to retrieve the external objects.

Figure 3:
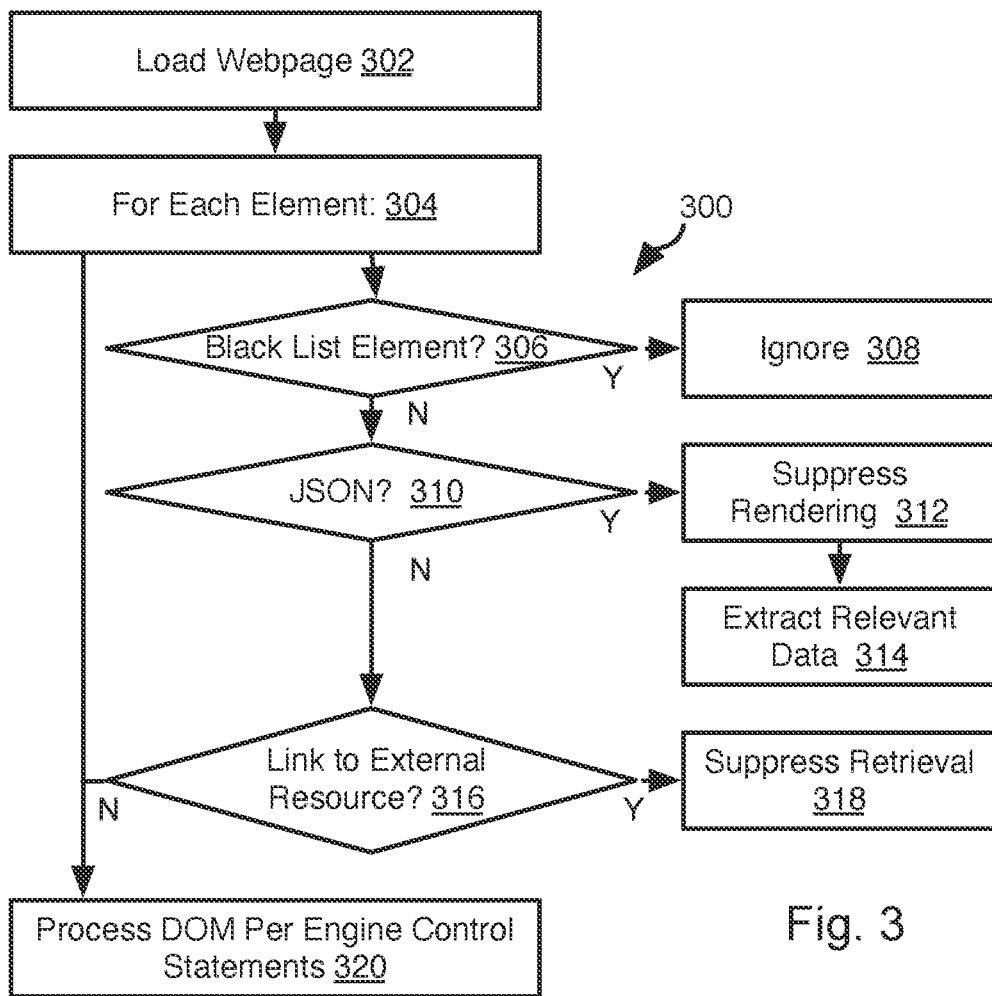
FIG. 3 is a process flow diagram of a method for processing webpages in accordance with an embodiment of the present invention.

FIG. 3 illustrates a method 300 that may be performed by the virtual browser 108 in order to extract data from a given webpage 118. Inasmuch as a retailer may have thousands of webpages 118, the virtual browser 108 may process the webpage 118 such that the amount of time spent is much less than that required to render the webpage 118 as in a conventional browser.

The method 300 may include loading 302 the webpage 118. The loading of step 302 may include loading a "thin" version of the webpage 118. For example, the webpage 118 may be an HTML document with executable code for retrieving one or more other objects of the DOM 202 of the webpage 118 but not actually including these other objects.

The method 300 may include processing 304 each element referenced in the webpage 118, such as in the DOM of the webpage 118, according to the illustrated steps. For example, an element may be found 306 to be a blacklisted element. Blacklisted elements may include elements that are known to be irrelevant, such as social media links 204, elements that retrieve advertisements from third parties. Inasmuch as the primary objective of the webcrawler engine 106 is to extract product data, potentially any element that is not product data or helpful to identifying product data may be added to the blacklisted elements.

For those elements found 306 to be blacklisted, the method 300 may include ignoring 308 such elements. Ignoring 308 an element may include some or all of: suppressing rendering of the element by the virtual browser 108, refraining from retrieving a resource referenced by the element, and refraining from executing executable code included in or referenced by the element. Ignoring a blacklisted element may include also ignoring descendants of the blacklisted element in the DOM 202.

For elements found 310 to be JSON objects 206, the method 300 may include suppressing 312 rendering of the JSON object 206 and extracting 314 data from the JSON object 206. An element that is found 310 to be a JSON object 206 may be included in the webpage 118 as loaded at step 302 or retrieved according to instructions included in the webpage 118. A JSON object 206 may include relevant information, such as text describing a garment, data describing its size, color, or other attribute, or other information. A JSON object 206 may also include other information that relates to its presentation, such as formatting, location definition, associated images, or other information that is not relevant to data extraction. Accordingly, by suppressing rendering and examining the JSON object 206 directly, extraction of data is accelerated.

In some embodiments, all JSON objects 206 are processed according to steps 312 and 314. In other embodiments, only certain JSON objects 206 are processed in this manner whereas others are blacklist elements or are rendered. For example, a JSON object 206 may have a known identifier such that JSON objects 206 having identifiers matching a predefined list of JSON identifiers are processed according to steps 312 and 314.

For elements found 316 to be links to external resources, the method 300 may include suppressing retrieval 318. In some embodiments, the link to the external resource, e.g., URL, may be extracted from the webpage 118 and stored, such as links to images or video depicting a product.

After or during processing of the elements of the webpage 118 according to steps 304-318, the method 300 may include processing 320 the DOM 202 of the webpage according to engine language statements, such as using the language processor 110.

Figure 4:
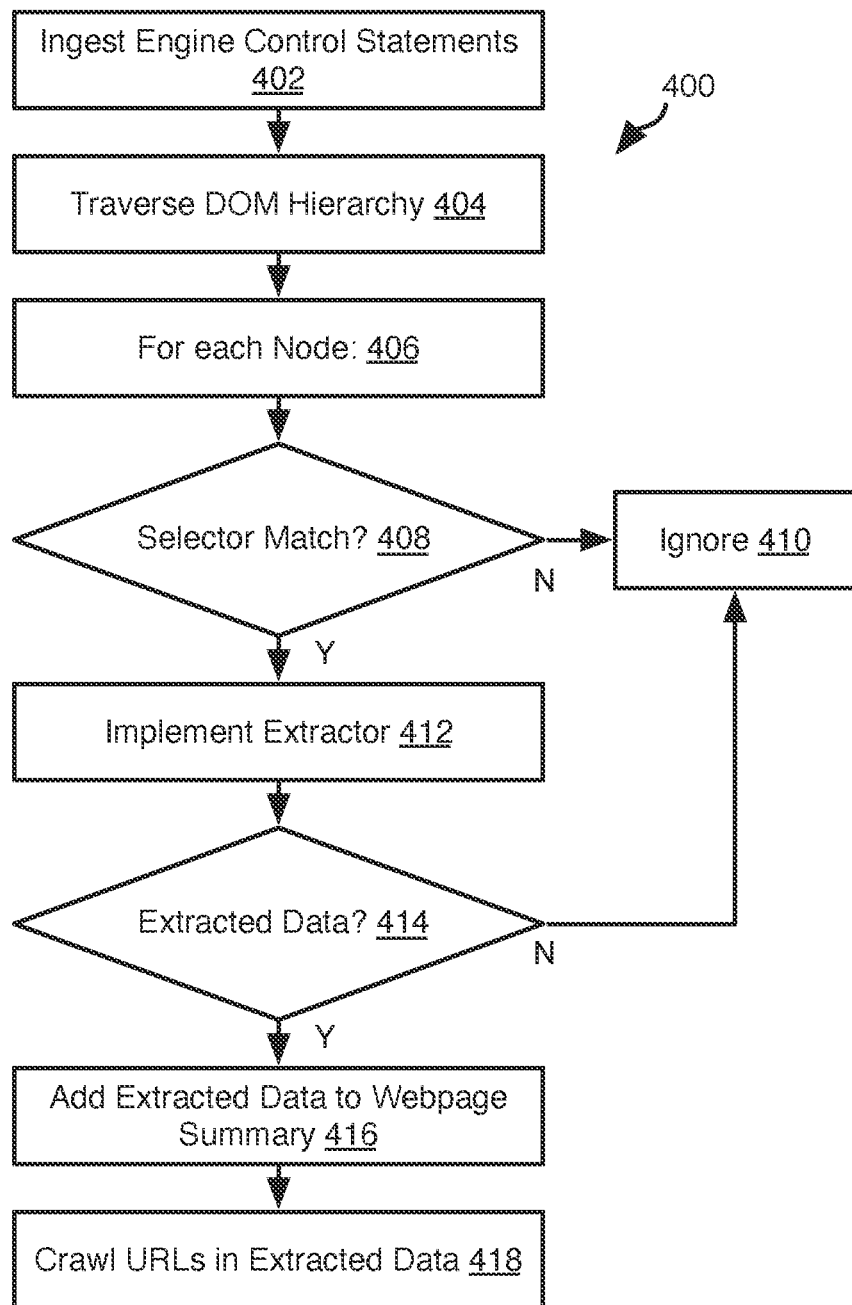
FIG. 4 is a process flow diagram of a method for processing a webpage according to engine control statements in accordance with an embodiment of the present invention.

FIG. 4 illustrates a method 400 for processing engine control statements with respect to a webpage 118. Engine control statements may be included in a script. For example, for a given retailer, a script may be generated by a human operator that provides guidance to the crawling engine 106 as to which elements of a webpage 118 contain product data or include links to other webpages 118 that contain product data. The script may be generated from inputs received from a user interface. For example, a user may select from a set of options that are then used to generate engine control statements intelligible to the crawling engine 106.

The engine control statements may be generated in groups of three statements, herein referred to as an extraction group. Each extraction group may include an identifier, a selector definition, and an extractor definition. The identifier may be a human intelligible label indicating the data to be extracted by the extraction group. The selector may be a statement defining how an element to be processed by the extractor is to be identified. The selector may define one or more attributes of an element that are used to verify that the element should be processed using the extractor. These attributes may be textual, such as string to match against one or more strings included in the element. The attributes may include an object type, e.g., an electronic shopping cart interface element used to identify a product page. The attributes may include formatting, such as whether the element includes or is a formatting element such as a list, grid, array, or other formatting element. The selector may reference a function that is executed with respect to an element with the output of the function indicating whether the element should be processed by the extractor.

The extractor specifies information to be extracted from the element. The extractor may be a reference to a function to be executed with respect to the element with the output of the function being the extracted data. The extractor may include names of one or more attributes of the element, the values of which are to be obtained by the extractor.

The method 400 may include ingesting 402 engine control statements, e.g., extraction groups, such as by parsing a script input by a user. The method 400 may include traversing 404 the DOM hierarchy 202 of the webpage 118 and processing 406 each node of the DOM hierarchy according to the extraction groups included in the engine control statements ingested at step 402.

For each node, the method 400 may include evaluating 408 whether there is a selector that matches that node. If not, that node, i.e. the element represented by that node, is ignored 410. In some instances, a selector may be applied to a node and its descendent nodes. For example, a selector may be applied to the entire webpage such that if the attributes referenced in the selector are not found in the root node of the DOM or any of its descendants, the webpage 118 is ignored. For example, product pages may be characterized by having a shopping cart element. Accordingly, where this element is absent from a webpage 118, the webpage 118 is ignored. Other attributes of a webpage 118 may be used to determine whether the webpage 118 is a product page, category page, or other webpage 118 that either has product data or links that will lead to webpages 118 including product data.

If a node is found 408 to satisfy the selector of an extraction group, the extractor of that extraction group is implemented 412 with respect to the element represented by that node. As noted above, this may include executing a specified function or obtaining values for attributes specified by the extractor. The function of the extractor may be performed with respect to descendants of the node. For example, the element may be a grid, array, list, or other object that represents a collection of other objects. The extractor may extract data from the objects that are part of this collection. For example, a collection of links to product pages may be processed to extract the links (i.e., URLs) to those product pages.

The method 400 may include evaluating 414 whether the extractor successfully extracted data. If not, the node may be ignored. If so, then the extracted data may be added 416 to a summary of the webpage 118. Where the extracted data includes one or more URLs, the method 400 may further include crawling 418 the webpages 118 referenced by those URLs. This may include processing these webpages 118 according to the methods 300 and 400.

The result of the method 400 for each webpage 118 may include one or both of extracted product data and a list of URLs included in the webpage 118 that are likely to correspond to product pages or lead to product pages due to the configuration of the selectors. The extracted product data may include images (e.g., links to images where resources are not retrieved per the method 300), text descriptions, available sizes, available inventor for each size, price, colors, or any other product attribute.

Figure 5:
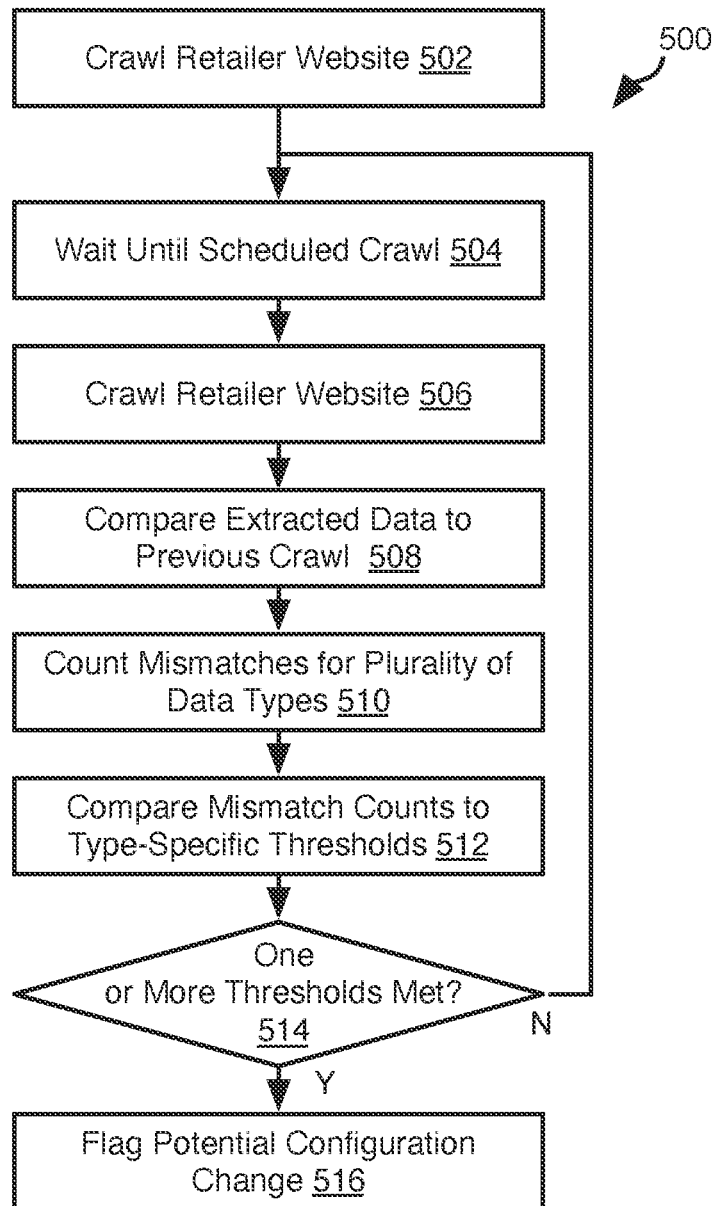
FIG. 5 is a process flow diagram of a method for detecting changes to a webpage in accordance with an embodiment of the present invention.

FIG. 5 illustrates a method 500 for evaluating the function of a script including engine control statements. The method 500 may be performed using the language processor 110. The method 500 may include crawling 502 a retailer website. Crawling 502 may include performing the methods 300 and 400 with respect to the webpages 118 constituting the website of the retailer.

Upon completion of crawling 502 the website, the method 300 may include waiting 504 until expiration of a predefined refresh rate, such as a period of an hour, a day, a week, or any other predefined interval. The refresh rate may be selected in order to provide accurate tracking of data that is changeable, such as availability and price.

Upon expiration of the predefined refresh rate, the method 500 may include again crawling 506 the retailer website and comparing data extracted from step 508 with the data extracted at step 502. For example, for a given product page, this may include comparing values for attributes such as the number of images, the number of sizes, the price, and inventory. For a category page or webpage with a number of links to other category pages or product pages, the number of URLs extracted may be compared. For each link extracted for a webpage at step 502, step 508 may include evaluating whether the same URL was extracted from that webpage.

The method 500 may include generating 510 counts of mismatches for a plurality of data types. Alternatively, mismatches are counted for a single data type or a single count is generated that counts all mismatches across all data types. Examples of data types for which mismatches may be counted include mismatched number of images, mismatched price, mismatched inventory, mismatched inventory. These are exemplary only and mismatches for any data type may be counted.

The method 500 may include comparing 512 the count mismatch for a given data type to a threshold for that data type. For example, changes in price or inventory are not necessarily indicative of a failure to correctly extract data. In contrast, the number of images and description are unlikely to change. Accordingly, the percentage of webpages with mismatches that indicate a potential problem is different for price and inventory than it is for mismatches in number of images or description. For example, if more than 20 percent of webpages are found 514 to have price mismatches, then a potential webpage configuration change may be flagged 516. Alternatively, if more than 10 percent of webpages are found 514 to have mismatched number of images, then a potential webpage configuration change may be flagged 516. Likewise, if more than 10 percent of webpages are found 514 to have mismatched descriptions, then a potential webpage configuration change may be flagged 516.

If a retailer website is flagged 516 as potentially having a configuration change, various actions may be taken. In some instances, a message to an administrator is generated and the administrator may then evaluated the retailer web site and possibly adjust the script of engine control statements to correctly extract data from the webpages of the web site.

If no data types have mismatch counts exceeding their corresponding thresholds, then the method continues at step 504 and another crawl is performed 506.

In other embodiments, self-healing may be performed in which the crawling engine 106 adjusts the engine control statements of the script to correctly extract data from the webpages of the retailer's website.

Figure 6:
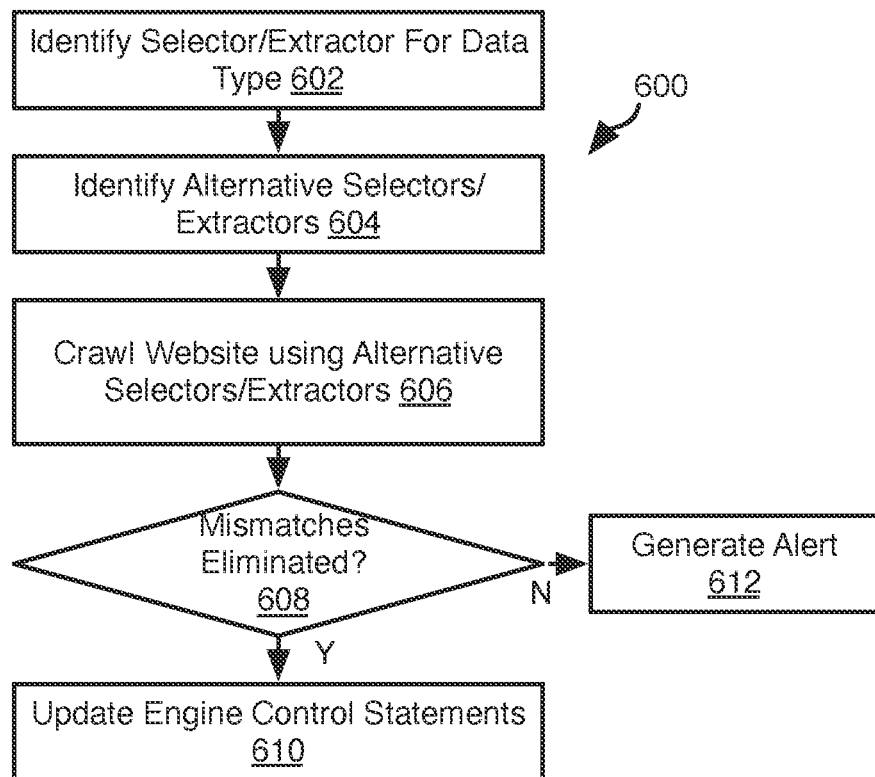
FIG. 6 is a process flow diagram of a method for healing a script of engine control statements in accordance with an embodiment of the present invention.
Figure 7:
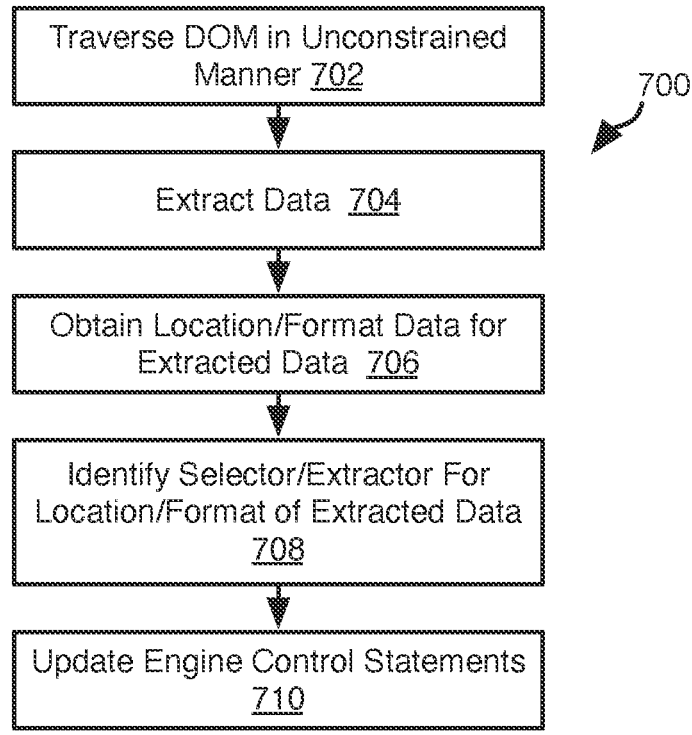
FIG. 7 is a process flow diagram of an alternative method for healing a script of engine control statements in accordance with an embodiment of the present invention.

FIGS. 6 and 7 illustrate potential methods for performing self-healing. Referring specifically to FIG. 6, a method 600 may include identifying 602 the selector and extractor used to extract data corresponding to the data type with the mismatches meeting the threshold condition ("the mismatched data type"). The method 600 may be repeated for each mismatched data type identified according to the method 500.

The method 600 may include identifying 604 alternative selectors and extractors. For example, there may be a finite set of configurations for a selector or an extractor from which alternatives may be identified. Alternatives may be identified from a library of selector and extractor configurations.

The method 600 may then include crawling 606 the website of the retailer using the alternative selectors and extractors. Inasmuch as there may be multiple selectors and extractors, step 608 may include crawling the website with some or all possible combinations of the multiple selectors and multiple extractors. Crawling 606 the website may be performed according to the methods described above using a script including extraction groups including a selector and extractor combination from the plurality of selector and extractor combinations.

The method 600 may include evaluating 608 whether any selector and extractor combination was able to eliminate mismatches for the mismatched datatype. Step 608 may include evaluating whether any selector and extractor combination was able to obtain a number of mismatches below the threshold for the mismatched data type. Where multiple selector and extractor combinations are found to yield mismatches below the threshold for the mismatched data type, the selector and extractor combination yielding the fewest mismatches will be selected.

If a selector and extractor combination is found 608 to be below the threshold for the mismatched data type, the script for the retailer website may be updated 610 to include replacing the selector and extractor for the mismatched data type with the selector and extractor combination found 608 to be satisfactory.

If mismatches are not found 608 to be below the threshold for the mismatched data type for any of the selector and extractor combinations, an alert may be generated 612 such that a human operator may attempt to revise the script to account for changes in the webpages 118 of the retailer.

FIG. 7 illustrates an alternative method 700 for performing self-healing. The method 700 may be performed with respect to one or more web pages of a retailer in order to discover changes in the configuration of the webpages, particularly product pages. The method 700 may include traversing 702 the nodes of the DOM in an unconstrained manner. This may include inspecting every element or a greater number of elements than would match selectors of the script. Likewise, the data inspected may include data that would not be extracted by the extractors of the script. Data of the elements corresponding to the nodes of the DOM may be extracted 704. In particular, data matching that which was extracted in a prior crawl (e.g., a prior crawl 502 or crawl 506 of the method 500) may be extracted 704 from the data inspected at step 702. As the extracted data is identified, the method 700 may further include obtaining 706 one or both of location data and format data for the extracted data. This may include identifying parent nodes of the element including an item of extracted data in the DOM, identifying formatting (e.g., HTML formatting tags) applicable to the item of extracted data, identifying neighboring elements (e.g., text, images, formatting attributes), or other information that may be used to identify the item of extracted data.

For each mismatched data type, the method 700 may include identifying 708 or generating a selector that is effective to identify items of data having that data type. Accordingly, the selector may include engine control statements that instruct the crawling engine 106 to identify elements having the location or formatting data identified at step 706. Likewise, step 708 may include identifying or selecting an extractor that is programmed to extract the item of data from the elements identified using the selector.

The method 700 may then include, for each mismatched data type, updating 710 the script by replacing an extraction group in the script for each mismatched data type with the selector and extractor from step 708 for that mismatched data type. A script updated according to the method 600, the method 700, or by a human administrator may be used according to the methods 400 to extract data from the webpages of a retailer's website as described above.

Figure 8:
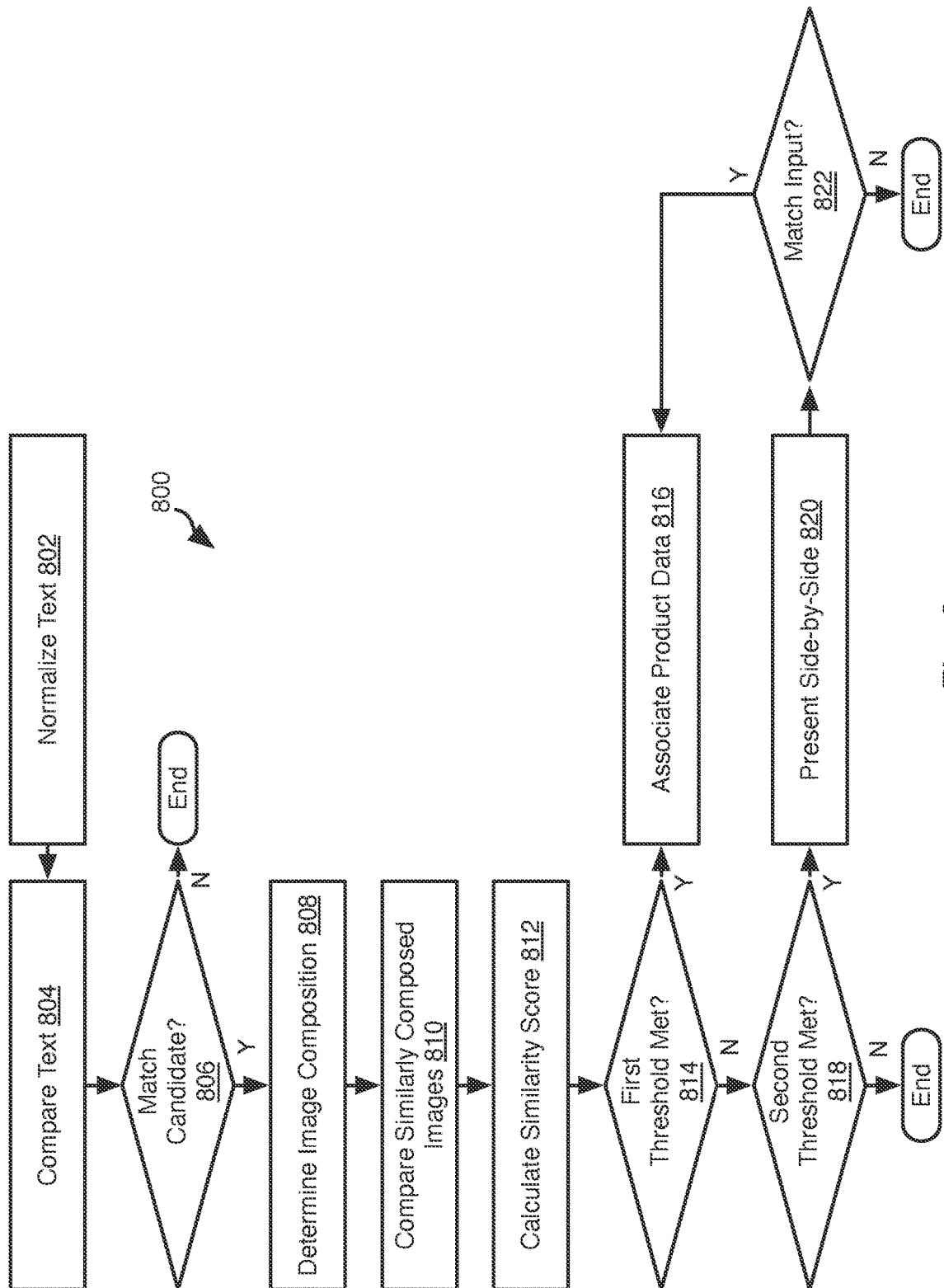
FIG. 8 is a process flow diagram of a method for correlating product data from multiple retailers in accordance with an embodiment of the present invention.

FIG. 8 illustrates a method 800 for combining product data from a retailer web site with data from one or more other sources. The one or more other sources may include the website of another retailer, a prior version of the retailer's website (e.g., before a major redesign), data from a manufacturer making products sold by the retailer, a third party website providing reviews or news, or any other source of product data.

The method 800 may be executed with respect to a first product record from a first source (e.g., the retailer) and a second product record from a second source (e.g., any of the other sources discussed above). The method 800 may include normalizing 802 text of one or both of the first and second product records. Inasmuch as the first product record may be that of the retailer performing the method 800, only the second product record is normalized in some embodiments. Normalizing 802 may include converting one or more numeric values, words, and phrases to normalized versions. Numeric values in one unit of measurement may be converted to a standard unit (e.g., shoe sizes may be converted to centimeters to enable comparison). Words describing size may be normalized to standard values, e.g. SM and S may be converted to "Small." Terms describing color may be normalized to standard values, e.g., Sable→Black, Scarlet→Red, etc.

The method 800 may include comparing 804 the first product record and the second product record as modified according to the normalizing step 802. The comparison may be a field-wise comparison such that data from one field of the first record is compared to data for that same field in the second product record. Examples of fields include name, description, size, price, style, color, material, or any other attributes that may be used to describe a product. Comparing 804 values for a field may include any textural comparison algorithm known in the art, such as string edit distance, Jaccard distance, or other measure of textual similarity.

The method 800 may include evaluating whether 806 the first product record and second records are match candidates. For example, where the metric of textural similarity decreases with similarity of samples being compared, step 806 may include evaluating whether the combined metrics for the fields of the first and second product records are below a threshold. Where the metric of textural similarity increases with similarity of samples being compared, step 806 may include evaluating whether the combined metrics for the fields of the first and second product records are above a threshold. The combined metrics may be obtained by summing, weighting and summing, or performing some other operation with respect to the metrics of textual similarity for the fields of the first and second product records.

If the first and second records are not found 806 to be match candidates, the method 800 may end with respect to the first and second product records. If the first and second records are found 806 to be match candidates, then the method 800 may continue with evaluation of first images of the first product record and second images of the second product record.

The method 800 may include processing the first and second images to determine 808 image composition. Determining image composition may include one or more steps. For example, the first and second images maybe segmented using one or more machine learning models. Each machine learning model may segment a particular type of feature, such as the product itself, a person wearing or using the product, background trees, background exteriors of structures, background interior walls, background interior decorations, or any other visible feature. A segment mask output by a machine learning model may be a set of pixel locations deemed by the machine learning model to correspond to the feature that the machine learning model is trained to identify.

Determining 808 the image composition may therefore include evaluating the segment masks from the plurality of machine learning models. The composition of the image may be a characterization of these segmentation masks, such as a vector of binary values, each bit position storing a first value (e.g., 1) if the machine learning model output a segmentation mask including pixels marked as corresponding to the feature that the machine learning model was trained to identify. A bit position may be a second value (e.g., 0) if the machine learning model did not mark pixels as corresponding to the feature.

The method 800 may include comparing 810 similarly composed first and second images. For example, if the composition of first image A is within a threshold similarity of second image B, then first image A and second image B may be compared. Similarity may be determined using any image comparison approach known in the art. In one example, the vectors outlined above may be compared, such as a cosine distance (e.g., dot product). If the cosine distance is greater than a predefined threshold, the images may be deemed to be similarly composed and further compared. Alternatively, each first image may be compared to whichever of the second images has the closest composition as measured according to any of the metrics above.

For a first image and a second image selected for comparison, the comparison may be of the entire image or of a portion of the first image and a portion of the second image. For example, the first image and the second image may be cropped to include only the portion thereof including the product depicted in the image and which corresponds to the first product record and second product record, respectively. The portion may be identified based on a segmentation mask obtained from a machine learning model that identifies the portion of the image corresponding to the product corresponding to the first product record and second product record, respectively. The first and second images may be processed according to the method 900 with the result of the method 900 being compared.

The comparison may be performed using a machine learning model trained estimate similarity of images. The comparison may be performed according to any approach for comparing similarity of images as known in the art. The output of the image comparison may be a value indicating a level of similarity of the images being compared.

The method 800 may include calculating 812 a similarity score for the first product record. The similarity score may be a combination of some or all of the result of the textural similarity according to step 804, composition similarity values used to select images for comparison at step 808, and the image similarity values from step 810. The values used may be combined by summing, weighting and summing, or some other means. Where some values increase with increasing similarity and other values decrease with increasing similarity, some values may be converted to conform to one or the other (e.g., 1−x or 1/x to change relationship between magnitude and similarity).

The similarity score may be compared to one or more thresholds. For example, if the similarity score is found 814 to meet a first threshold condition, then the first product record and the second product record will be deemed to be for the same product. The first and second product record may then be associated 816 with one another by one or both of merging data in the first and second product records or creating a link between the first and second product records.

If the similarity score is not found 814 to meet the first threshold condition but is found 818 to meet a second threshold condition, the method 800 may include presenting 820 a side-by-side comparison of the images and text of the first product record and the second product record on a display device. If a match input is found 822 to be received from a human operator, the match input indicating that the first and second product records correspond to the same product, then the first and second product records are associated 816 with one another. If not, the method 800 ends with respect to the first product record and the second product record.

If the similarity score is not found 818 to meet the second threshold condition, then the method 800 may end with respect to the first and second product records.

The first and second threshold conditions may be such that the first threshold condition requires greater similarity between the first product record and second product record than the second threshold condition. Where a higher similarity score indicates higher similarity, the first threshold condition may be a first threshold value that is higher than a second threshold value for the second threshold condition. Where a lower similarity score indicates higher similarity, the first threshold condition may be a first threshold value that is lower than a second threshold value for the second threshold condition.

Figure 9:
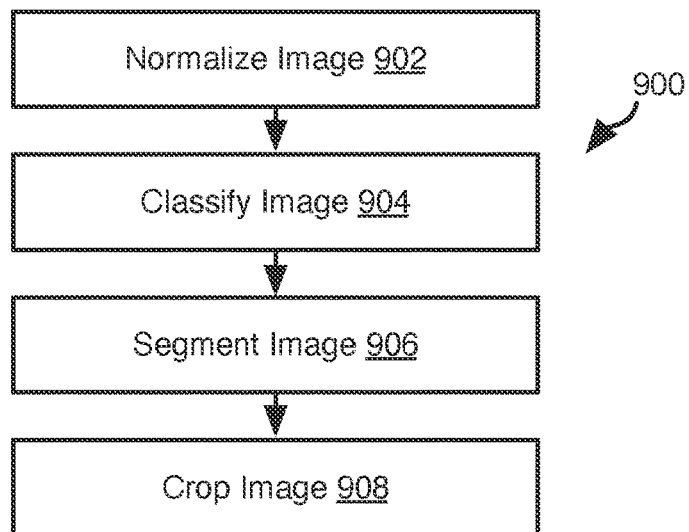
FIG. 9 is a process flow diagram of a method for processing images for correlation in accordance with an embodiment of the present invention.

FIG. 9 illustrates a method for processing images prior to the comparison step 810. The method 900 may also be used to generate images that are associated with a product record. For example, images of a second product record that are associated with a first product record may be processed according to the method 900 and the result associated with the first product record. In this manner, when making a visual presentation of a product record to a user, images may be composed similarly to enable easy comparison.

The method 900 may include normalizing 902 the image. Normalizing the image may include changing attributes of the image to enable the image to be compared more readily with other images. For example, normalizing 902 may include changing the number of bits used to store each pixel, converting the image to a common image format, converting the image to a standard size, converting the image to a common resolution, or changing one or more other attributes of the image as a whole.

The method 900 may include classifying 904 the image. Classifying 904 may include selecting one or more values to characterize the image, e.g. interior or exterior, with or without model, white background or not, etc. These classifications may be output by one or more machine learning models trained to perform the classification.

The method 900 may include segmenting 906 the image. As described above, this may include processing the image (e.g., the image after normalizing 902), using a plurality of machine learning models. Each machine learning model is trained to output a segmentation mask indicating pixels of the image corresponding to the feature that the machine learning model was trained to identify.

One of the features identified may be a product depicted in the image. The method 900 may include cropping 908 the image (e.g., the normalized image from step 902) to include a portion of the image including the product. For example, a smallest bounding box including all pixels identified as corresponding to the product may be identified. The image may be cropped to this bounding box either with or without a border one or more pixels wide around this bounding box.

Figure 10:
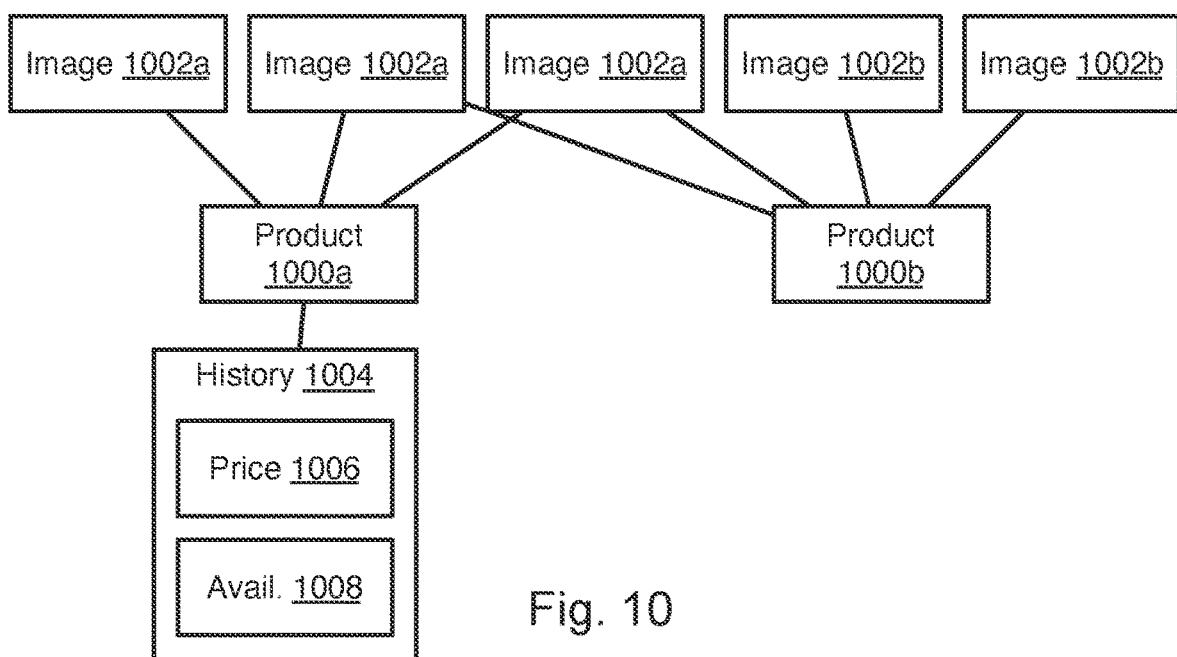
FIG. 10 is a schematic block diagram of a graph relating images to products in accordance with an embodiment of the present invention.

FIG. 10 illustrates a graph that may be used to represent the relationship between product records, such as first and second product records that have been associated 816 with one another according to the method 800. Each product record 1000a, 1000b may have a one or more images 1002a, 1002b, respectively, associated therewith. Each node of the graph may be a product record 1000a, 1000b or an image 1002a, 1002b. The product record 1000a, 1000b may include the text description of the product and a product identifier.

When the product record 1000a is associated with product record 1000b according to the method 800, the graph may be modified to include links between product record 1000a and the images 1002b. Likewise, links may be added between the product record 1000b and the images 1002a. In this manner, when providing a visual representation of the product record 1000a, the links of the graph may be followed to identify images 1002a and 1002 that may be added to the visual representation.

The graph may include additional information that may be linked to a product record 1000a, 1000b. The additional information may include a history 1004 for the product record 1000a, 1000b, such as a price history 1006 and availability history 1008. The availability history 1008 may list availability of a product and possibly availability of different variations (e.g., sizes, colors, etc.) of the product.

Figure 11:
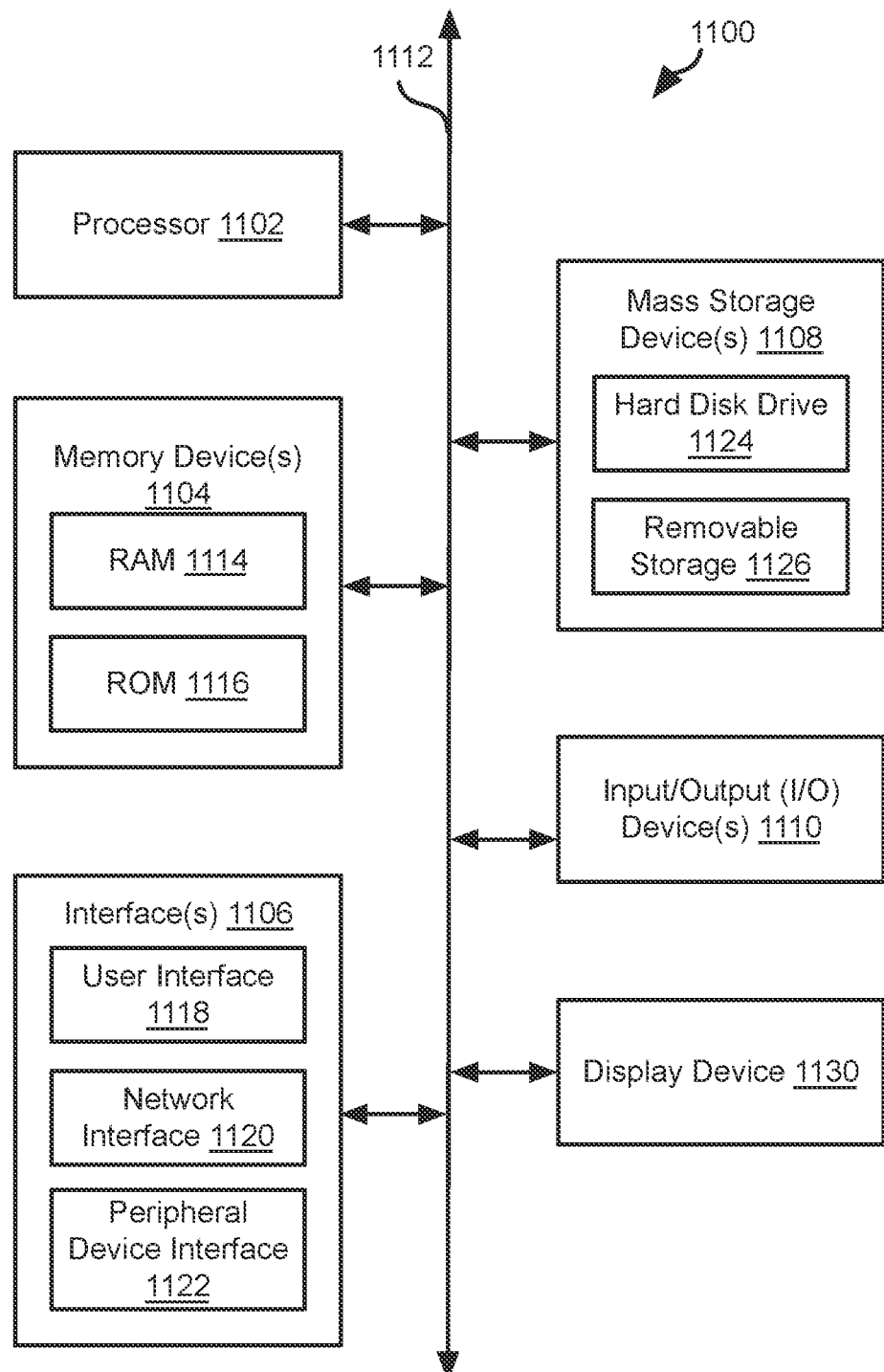
FIG. 11 is a schematic block diagram illustrating an example computing device suitable for implementing methods in accordance with embodiments of the present invention.

FIG. 11 is a block diagram illustrating an example computing device 1100. Computing device 1100 may be used to perform various procedures, such as those discussed herein. A server systems 102, 112 may include one or more computing devices 1100 and a user computing device 122 may be embodied as a computing device 1100.

Computing device 1100 includes one or more processor(s) 1102, one or more memory device(s) 1104, one or more interface(s) 1106, one or more mass storage device(s) 1108, one or more Input/Output (I/O) device(s) 1110, and a display device 1130 all of which are coupled to a bus 1112. Processor(s) 1102 include one or more processors or controllers that execute instructions stored in memory device(s) 1104 and/or mass storage device(s) 1108. Processor(s) 1102 may also include various types of computer-readable media, such as cache memory. The processor 1102 may be embodied as or further include a graphics processing unit (GPU) including multiple processing cores.

Memory device(s) 1104 include various computer-readable media, such as volatile memory (e.g., random access memory (RAM) 1114) and/or nonvolatile memory (e.g., read-only memory (ROM) 1116). Memory device(s) 1104 may also include rewritable ROM, such as Flash memory.

Mass storage device(s) 1108 include various computer readable media, such as magnetic tapes, magnetic disks, optical disks, solid-state memory (e.g., Flash memory), and so forth. As shown in FIG. 11, a particular mass storage device is a hard disk drive 1124. Various drives may also be included in mass storage device(s) 1108 to enable reading from and/or writing to the various computer readable media. Mass storage device(s) 1108 include removable media 1126 and/or non-removable media.

I/O device(s) 1110 include various devices that allow data and/or other information to be input to or retrieved from computing device 1100. Example I/O device(s) 1110 include cursor control devices, keyboards, keypads, microphones, monitors or other display devices, speakers, printers, network interface cards, modems, lenses, CCDs or other image capture devices, and the like.

Display device 1130 includes any type of device capable of displaying information to one or more users of computing device 1100. Examples of display device 1130 include a monitor, display terminal, video projection device, and the like.

Interface(s) 1106 include various interfaces that allow computing device 1100 to interact with other systems, devices, or computing environments. Example interface(s) 1106 include any number of different network interfaces 1120, such as interfaces to local area networks (LANs), wide area networks (WANs), wireless networks, and the Internet. Other interface(s) include user interface 1118 and peripheral device interface 1122. The interface(s) 1106 may also include one or more peripheral interfaces such as interfaces for printers, pointing devices (mice, track pad, etc.), keyboards, and the like.

Bus 1112 allows processor(s) 1102, memory device(s) 1104, interface(s) 1106, mass storage device(s) 1108, I/O device(s) 1110, and display device 1130 to communicate with one another, as well as other devices or components coupled to bus 1112. Bus 1112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1100, and are executed by processor(s) 1102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

These example devices are provided herein purposes of illustration, and are not intended to be limiting. Embodiments of the present disclosure may be implemented in further types of devices, as would be known to persons skilled in the relevant art(s). At least some embodiments of the disclosure have been directed to computer program products comprising such logic (e.g., in the form of software) stored on any computer useable medium. Such software, when executed in one or more data processing devices, causes a device to operate as described herein.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed is:

1. A method for web crawling comprising:
    retrieving, by a computer system, a webpage including instructions for rendering a plurality of elements;
    ingesting, by a crawling engine executing on the computer system, a set of extraction instructions;
    traversing, by the crawling engine, the plurality of elements of the webpage to identify selected elements from the plurality of elements based at least in part on the set of extraction instructions;
    applying, by the crawling engine, the set of extraction instructions to the selected elements of the webpage to extract selected data of the webpage according to the set of extraction instructions, wherein the selected data includes at least a first product image;
    extracting, by the crawling engine, second extracted data associated with a second webpage having a different domain than the webpage and not referenced in the webpage, wherein the second selected data includes at least a second product image;
    determining that a textual similarity between the selected data from the webpage and the second extracted data associated with the second webpage satisfies a first threshold;
    comparing, in response to determining that the textual similarity satisfies the first threshold and by the computer system, the first product image to the second product image to determine an image similarity;
    determining, by the computer system and based at least in part on the textual similarity and the image similarity, that the similarity of the webpage and the second webpage satisfies a second threshold;
    generating, in response to determining that the similarities satisfy the second threshold and by the computer system, an association between the webpage and the second webpage as corresponding to the same product;
    determining textual information included in the second extracted data associated with the second webpage and not included in the selected data of the webpage; and
    adding at least a portion of the textual information to content from the webpage.

2. The method of claim 1, wherein the set of extraction instructions include one or more extraction groups, each extraction group including:
    a selector instructing the crawling engine to identify the selected elements from the plurality of elements; and
    an extractor instructing the crawling engine to extract the selected data from the selected elements.

3. The method of claim 2, wherein the extractor of at least one of the one or more extraction groups is programmed to extract the selected data from descendants of an element of the plurality of elements identified by the selector of the at least one of the one or more extraction groups.

4. The method of claim 3, wherein the selector of the at least one of the one or more extraction groups instructs the crawling engine to identify a data structure including any of an array, list, and grid.

5. The method of claim 4, wherein the extractor of the at least one of the one or more extraction groups instructs the crawling engine to extract the selected data from elements of the plurality of elements that are descendants of the data structure.

6. The method of claim 1, further comprising:
    determining, by the computer system, that a second element from the plurality of elements is a JavaScript Object Notation (JSON) object;
    extracting data associated with the second element; and
    suppressing rendering of the JSON object.

7. The method of claim 1, further comprising:
    determining, by the computer system, that a third element from the plurality of elements is a link to an external resource; and
    suppressing retrieval of the external resource.

8. The method of claim 1, wherein the determining that the webpage and the second webpage correspond to the same product is further based at least in part on the extracted selected data and the second extracted data.

9. The method of claim 1, wherein the second website includes at least one of:
    product review content of the first product; or
    product information of the first product from a provider or manufacturer of the first product.

10. The method of claim 1, further comprising:
    generating, by the computer system, a link between the first product image and the second product image in the association of the webpage and the second webpage; and
    generating, by the computer system, a summary of the webpage that includes at least the selected data, the first product image, and the link, wherein the link provides access to the second extracted data.

11. A system comprising:
    one or more processing devices;
    one or more memory devices operably coupled to the one or more processing devices, the one or more memory devices storing executable code that, when executed by the one or more processing devices, causes the one or more processing devices to:
        retrieve a webpage including instructions for rendering a plurality of elements associated with the webpage;
        ingest, by a crawling engine, a set of extraction instructions, wherein the set of extraction instructions includes one or more extraction groups including a selector definition specifying selected elements from the plurality of elements that are to be extracted;
        traverse, by the crawling engine, the plurality of elements of the webpage to identify selected elements from the plurality of elements based at least in part on the set of extraction instructions;
        apply, by the crawling engine, the set of extraction instructions to the elements of the webpage to extract selected data of the webpage according to the set of extraction instructions, wherein the selected data includes at least a first product image;

extract, by the crawling engine, second extracted data associated with a second webpage having a different domain than the webpage and not referenced in the webpage, wherein the second selected data includes at least a second product image;

determining that a textual similarity between the selected data from the webpage and the second extracted data associated with the second webpage satisfies a first threshold;

compare the first product image to the second product image in response to determining that the textual similarity satisfies the first threshold to determine an image similarity;

determine, based at least in part on comparison of the first product image to the second product image, that the webpage and the second webpage correspond to a same product;

generate, in response to determining that the similarities satisfy the second threshold, an association between the webpage and the second webpage;

determine textual information included in the second extracted data associated with the second webpage and not included in the selected data of the webpage; and outputting at least a portion of the textual information in association with content of the webpage.

12. The system of claim 11, wherein the extractor of at least one of the one or more extraction groups is programmed to extract the selected data from descendants of an element of the plurality of elements identified by the selector of the at least one of the one or more extraction groups.

13. The system of claim 12, wherein the selector of the at least one of the one or more extraction groups is programmed to instruct the crawling engine to identify a data structure including any of an array, list, and grid.

14. The system of claim 13, wherein the extractor of the at least one of the one or more extraction groups is programmed to instruct the crawling engine to extract the selected data from elements of the plurality of elements that are descendants of the data structure.

15. A method for web crawling comprising:
retrieving, by a computer system, a plurality of webpages, wherein each of the plurality of webpages is associated with a respective plurality of elements;
ingesting, by a crawling engine, a set of extraction instructions;
for each webpage of a plurality of webpages of a website, processing each webpage by the crawling engine according to the set of extraction instructions to obtain a first extracted data for each webpage from each respective plurality of elements, wherein the first extracted data includes at least a first product image;
following a delay period, again processing, by the crawling engine, each webpage of the plurality of webpages to obtain second extracted data for each webpage, wherein the second extracted data includes at least a second product image;
comparing, by the computer system, the first product image to the second product image;
determining, by the computer system and based at least in part on the comparing the first product image to the second product image, that the first product image corresponds to the second product image;
determining, by the computer system, differences between the first extracted data and the second extracted data, wherein the differences include at least one textual difference between the first extracted data and the second extracted data;
determining, by the computer system, that the differences between the first extracted data and the second extracted data meets a threshold condition; and
in response determining that the differences between the first extracted data and the second extracted data meets the threshold condition, and determining that the first product image corresponds to the second product image, outputting, by the computer system, the at least one textual difference associated with the delay period.

16. The method of claim 15, wherein determining the differences between the first extracted data and the second extracted data comprises determining, for each webpage of the plurality of webpages, a first number of items of data extracted from each webpage in the first extracted data and a second number of items of data extracted from each webpage in the second extracted data.

17. The method of claim 16, wherein the threshold condition is a number of webpages of the plurality of webpages having differences between the first number and the second number.

18. The method of claim 15, wherein determining the differences between the first extracted data and the second extracted data comprises:
for each data type of a plurality of data types and each webpage of the plurality of webpages:
determining a first count of data of each data type in the first extracted data; and
determining a second count of data of each data type in the second extracted data; and
for each data type of the plurality of data types:
determining a mismatch count of webpages of the plurality of webpages having mismatches between the first count and the second count for each data type; and
if the mismatch count of webpages for each data type meets a threshold condition, flagging the website as having the change in configuration.

19. The method of claim 18, wherein the threshold condition for each data type of the plurality of data types is different.

20. The method of claim 15, further comprising:
adjusting, by the computer system, the set of extraction instructions in response to the flagging of the website as having a changed configuration.

* * * * *